(12) United States Patent
Buchanan et al.

(10) Patent No.: US 12,703,048 B2
(45) Date of Patent: Aug. 11, 2026

(54) SYSTEM AND METHOD FOR CRACKING A CONNECTING ROD

(71) Applicants: Toyota Motor Engineering & Manufacturing North America, Inc., Plano, TX (US); Toyota Jidosha Kabushiki Kaisha, Toyota (JP)

(72) Inventors: Craig Allen Buchanan, Milton, WV (US); Adam Joseph Haynes, Charleston, WV (US); Toshiki Fujikawa, Hurricane, WV (US); Yasuhiro Waki, Nagoya (JP); Yuya Fukaya, Nagoya (JP)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 867 days.

(21) Appl. No.: 17/876,003

(22) Filed: Jul. 28, 2022

(65) Prior Publication Data

US 2024/0033857 A1 Feb. 1, 2024

(51) Int. Cl.
*B23K 26/364* (2014.01)

(52) U.S. Cl.
CPC .................................. *B23K 26/364* (2015.10)

(58) Field of Classification Search
CPC ..... B23K 26/364; B23K 26/381; B23D 31/00
USPC ............................ 219/121.69, 121.7, 121.82
See application file for complete search history.

(56) References Cited

U.S. PATENT DOCUMENTS 5,882,438 A * 3/1999 Luchner ............... B23D 31/003 225/2
7,673,388 B2 * 3/2010 Hase .................... B23D 31/003 29/888.09
10,480,565 B2 11/2019 Kawazoe
2012/0111841 A1 * 5/2012 Murison .............. B23K 26/382 219/121.71
2014/0090515 A1 4/2014 Gruhler et al.

FOREIGN PATENT DOCUMENTS

DE 102004026297 A1 * 9/2005 .............. F16C 9/045
DE 102016010556 A1 2/2017
EP 3502495 A1 * 6/2019 ........... B23K 26/382
JP 2012521895 A * 9/2012 ............. H01L 21/78
(Continued)

OTHER PUBLICATIONS

DE102004026297A1 translate (Year: 2025).*
(Continued)

*Primary Examiner* — Steven W Crabb
*Assistant Examiner* — Yeong Juen Thong
(74) *Attorney, Agent, or Firm* — Christopher G. Darrow; Darrow Mustafa PC

(57) ABSTRACT

A method for creating a cracking line in a connecting rod includes etching, using a first pass of a laser, a groove in an inner surface of a larger bore of a connecting rod by removing material from the inner surface. The groove may be discontinuous and include a plurality of holes that are spaced apart and have different depths. The method further includes removing more material from the groove using a second pass of the laser to increase the depths of the holes, thereby increasing the stress concentration factor of the groove.

8 Claims, 4 Drawing Sheets

(56) References Cited

FOREIGN PATENT DOCUMENTS

| | | | | | |
|---|---|---|---|---|---|
| JP | 2021196059 | A | | 12/2021 | |
| WO | WO-2018111998 | A1 | * | 6/2018 | ......... C03B 33/0222 |

OTHER PUBLICATIONS

JP2012521895A machine translated (Year: 2012).*

Youtube, “Connecting Rod—Laser Grooving (with Cracking Machine)”, Retrieved from the Internet: <https://www.youtube.com/watch?v=QIVrDJBiqd4>, Retrieved Jun. 20, 2022.

* cited by examiner 100
102
104
106
108
110
112
114
116
118, 118A
118, 118B
120
122, 122A
122, 122B
124, 124A
124, 124B

SYSTEM AND METHOD FOR CRACKING A CONNECTING ROD

TECHNICAL FIELD

The subject matter described herein relates, in general, to systems and methods for cracking a connecting rod and, more specifically, to systems and methods for cracking a connecting rod using a two-pass laser method.

BACKGROUND

The background description provided is to present the context of the disclosure generally. Work of the inventors, to the extent it may be described in this background section, and aspects of the description that may not otherwise qualify as prior art at the time of filing, are neither expressly nor impliedly admitted as prior art against the present technology.

Internal combustion engines for automobiles include, among other components typical of internal combustion engines, connecting rods used to connect the piston to the crankshaft. Connecting rods are usually made of metal, such as steel, although other materials can be used. A connecting rod typically has a smaller end with a smaller bore that connects to the piston and a larger end with a larger bore that connects to the crankshaft.

In some cases, connecting rods are initially made as a single unitary component. The eye of the connecting rod is then broken and/or cut into two separate pieces in a controlled manner. This process allows the connecting rod shank and the bearing to fit precisely upon reassembly. However, defects in the cracking process can result in connecting rods that cannot be properly reassembled or negatively impact the longevity of the connecting rod if assembly was possible.

SUMMARY

This section generally summarizes the disclosure and is not a comprehensive explanation of its full scope or all its features.

In one embodiment, a method for creating a cracking line in a connecting rod is disclosed. The method includes etching, using a first pass of a laser, a groove in an inner surface of a larger bore of a connecting rod by removing material from the inner surface. The groove may be discontinuous and may include a plurality of holes that are spaced apart and have different depths. The method further includes removing more material from the groove using a second pass of the laser to increase the depths of the holes, thereby increasing the stress concentration factor of the groove.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for etching a cracking line in a connecting rod. The cracking line may include a groove that is used to crack the connecting rod into a connecting rod shaft and a connecting rod cap so that a bearing can be installed to a larger bore of the connecting rod. The groove may be etched into the connecting rod using a two-pass laser method. Using a first pass, the laser may etch a discontinuous groove in an inner surface of the larger bore by removing material from the inner surface. The groove may include a plurality of holes that are spaced apart and have different depths. Using a second pass, the laser may remove more material from the groove to increase the depths of the holes, thereby increasing the stress concentration factor of the groove. By increasing the stress concentration factor of the groove, smoother cracking surfaces, and therefore higher quality parts, may be obtained.

Figures 1A, 1B, 1C:
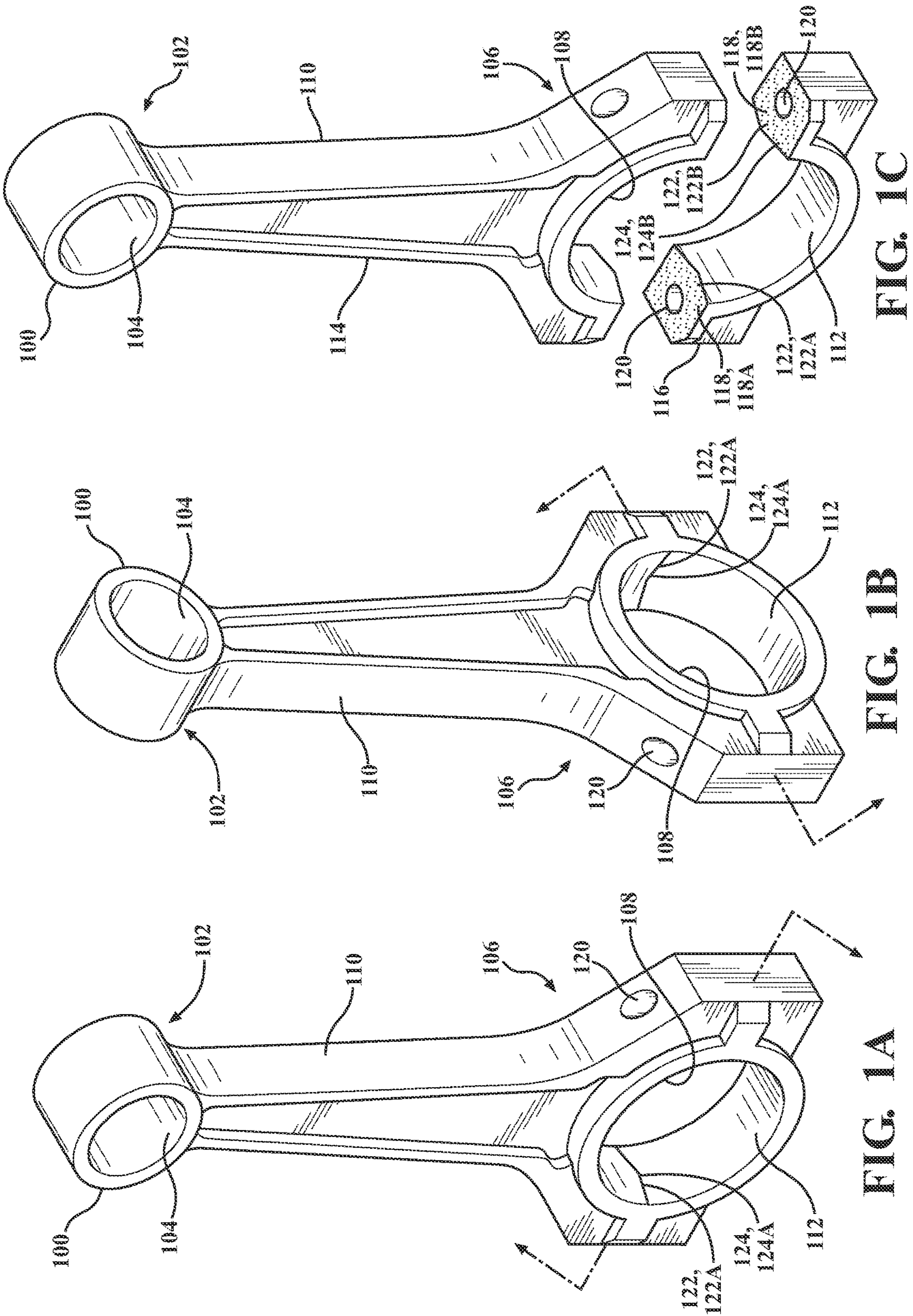
FIG. 1A illustrates one example of a connecting rod having a laser-etched cracking line showing the connecting rod formed as a unitary component.
FIG. 1B illustrates another view of the connecting rod of FIG. 1A.
FIG. 1C illustrates the connecting rod of FIGS. 1A and 1B showing the connecting rod cracked into a connecting rod shaft and a connecting rod cap.

Referring to FIGS. 1A, 1B, and 1C, a connecting rod 100 is typically formed by machining a blank. The blank may be a unitarily formed component, for example, a component formed by injection molding, metal casting, or any other suitable method. The connecting rod 100 may be made out of metal, such as steel, aluminum, or any other suitable material. The connecting rod 100 includes a smaller end 102 with a smaller bore 104 and a larger end 106 with a larger bore 108, sometimes referred to as an eye.

The connecting rod 100 also includes a shaft 110 connecting the smaller end 102 and the larger end 106. When installed in an internal combustion engine, the smaller bore 104 may be connected to a piston of the internal combustion engine and the larger bore 108 may be connected to a crankshaft, which may transfer power from the movement of the pistons of the engine to downstream transmission components. The smaller bore 104 may include a bushing used to connect the smaller end 102 to the piston, and the larger bore 108 may include a bearing used to connect the larger end 106 to the crankshaft. The bearing may be installed to an inner surface 112 of the larger bore 108.

With specific reference to FIG. 1C, in order to install the bearing to the larger bore 108, the connecting rod 100 may be cracked (e.g., split) into two pieces at the larger bore 108. The connecting rod 100 may be cracked into a connecting rod shaft 114 and a connecting rod cap 116. After cracking, the connecting rod shaft 114 and the connecting rod cap 116 may each define cracking surfaces 118. More specifically, the connecting rod shaft 114 may define a connecting rod shaft cracking surface 118A and the connecting rod cap 116 may define a connecting rod cap cracking surface 118B. The connecting rod shaft cracking surface 118A and the connecting rod cap cracking surface 118B may each define cross-sectional areas.

As mentioned above, cracking the connecting rod 100 allows the bearing to be installed to the larger bore 108. Once the bearing is installed to the larger bore 108, the connecting rod 100 may then be reassembled using apertures 120 on either side of the larger bore 108 that may be used to connect the connecting rod shaft 114 and the connecting rod cap 116 using bolts or any other suitable fastener. In some instances, cracking the connecting rod 100 offers various benefits over other methods of forming a connecting rod having a bearing. Other methods may include, for example, cutting a connecting rod or forming two separate parts of a connecting rod that are later connected together. Using these methods may produce mating surfaces that are difficult to align without other means of alignment, such as knock pins. However, when the connecting rod 100 is cracked, the cracking surfaces 118 may be smooth and fit well together when the connecting rod 100 is reassembled without the need of added parts.

Referring again to FIGS. 1A-1C, cracking may be performed by cracking the connecting rod 100 along cracking lines 122 formed in the inner surface 112. The cracking lines 122 may include a first cracking line 122A and a second cracking line 122B. The cracking lines 122 may be grooves 124 that are etched into the inner surface 112 by removing material from the inner surface 112 using a laser or any other suitable device. More specifically, the first cracking line 122A may include a first groove 124A and the second cracking line 122B may include a second groove 124B. Once the grooves 124 are etched into the inner surface 112, an object such as a wedge element may be introduced to the larger bore 108 to split the connecting rod 100 along the cracking lines 122. This may be referred to as a one-pass laser method for cracking a connecting rod. In other words, the laser is passed over the inner surface 112 of the larger bore 108 one time for each cracking line 122A and 122B.

In some instances, the one-pass laser method may be insufficient for cracking connecting rods with larger cross-sectional cracking areas. This may be because the one-pass laser method does not produce cracking lines with a high enough stress concentration factor. This may lead to rough cracking surfaces that do not fit well together during reassembly of the connecting rod. In such instances, it may be advantageous to increase the stress concentration factor of the cracking line to prepare the connecting rod 100 for cracking. Accordingly, described below is a system for implementing a two-pass laser method for creating cracking lines 122 with a higher stress concentration factor.

Figure 2:
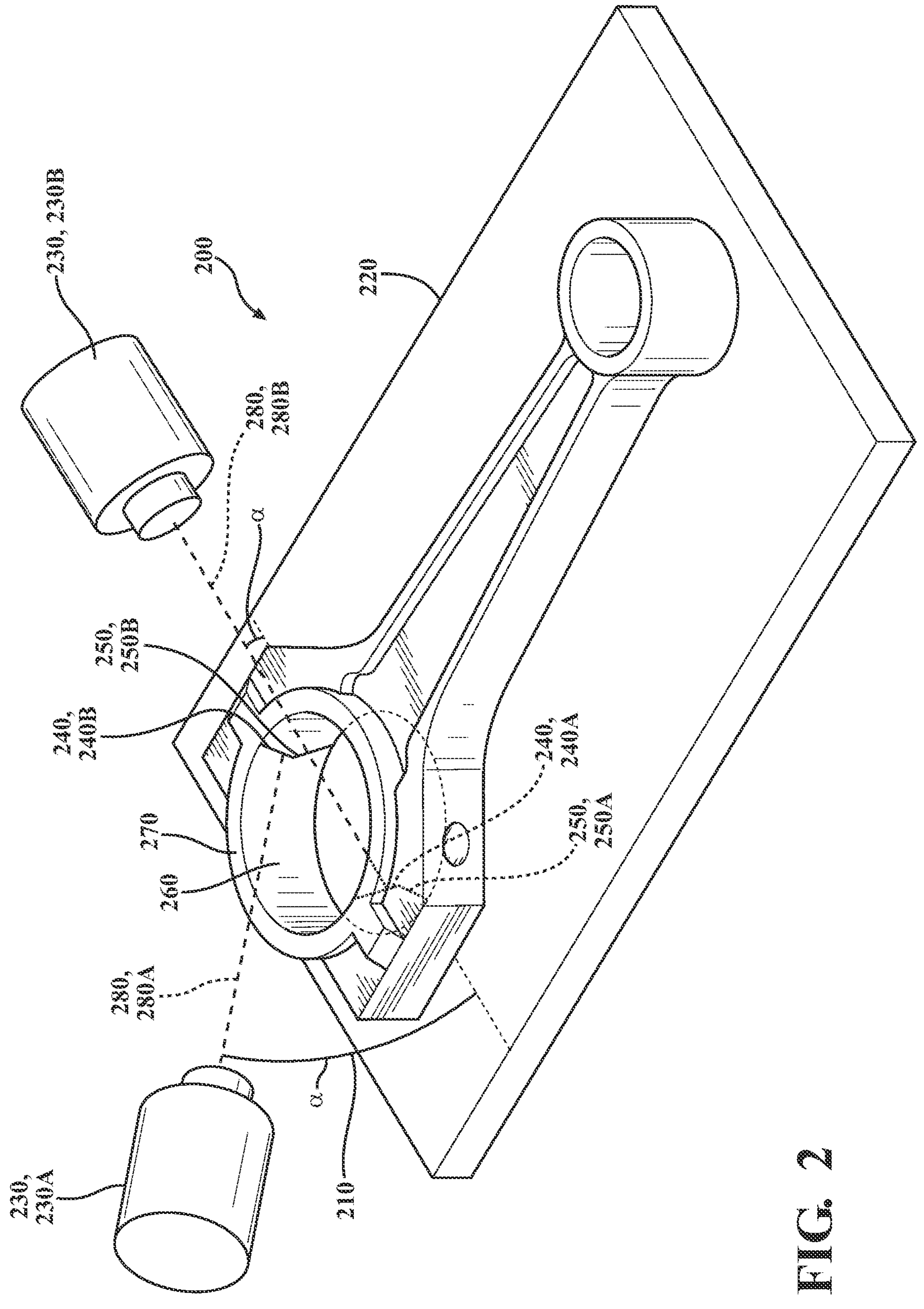
FIG. 2 illustrates a system including one or more lasers that may be used to etch a groove into a connecting rod for cracking the connecting rod.

Referring now to FIG. 2, an exemplary connecting rod cracking system 200 for implementing the two-pass laser method is shown. The connecting rod cracking system 200 may include a connecting rod 210 that may be placed on a surface 220 such as a workstation. The connecting rod cracking system 200 may also include one or more lasers 230. For example, the connecting rod cracking system 200 may include a first laser 230A and a second laser 230B. The laser(s) 230 may be used for creating one or more cracking lines 240 in the connecting rod 210. More specifically, the laser(s) 230 may be used for etching one or more grooves 250 into an inner surface 260 of a larger bore 270 of the connecting rod 210 to create the cracking lines 240. The laser(s) 230 may be positioned above the connecting rod 210 and angled down toward the connecting rod 210 so that each laser 230 may etch a groove 250 into the inner surface on the opposite side of the connecting rod 210 from where the laser 230 is positioned. For example, the second laser 230B may be used to etch a first groove 250A in the inner surface 260 to create a first cracking line 240A, and the first laser 230A may be used to etch a second groove 250B into the inner surface 260 to create a second cracking line 240B.

The first laser 230A and the second laser 230B may operate at the same time or may operate at different times. Moreover, the laser(s) 230 may be configured to emit light beams 280 that are used to etch the grooves 250. For example, the first laser 230A may emit a first light beam 280A to etch the second groove 250B, and the second laser 230B may emit a second light beam 280B to etch the first groove 250A. With the laser(s) 230 positioned above the connecting rod 210 and angled down toward the connecting rod 210, the light beams 280 may be directed at an angle $\alpha$ with respect to a plane defined by the surface 220. The angle $\alpha$ may be any suitable angle. For example, the angle $\alpha$ may be about 30°, about 40°, about 50°, about 60°, or any other suitable angle. Accordingly, the light beam 280 may hit the inner surface 260 at an angle that is less than substantially 90°.

Figure 3:
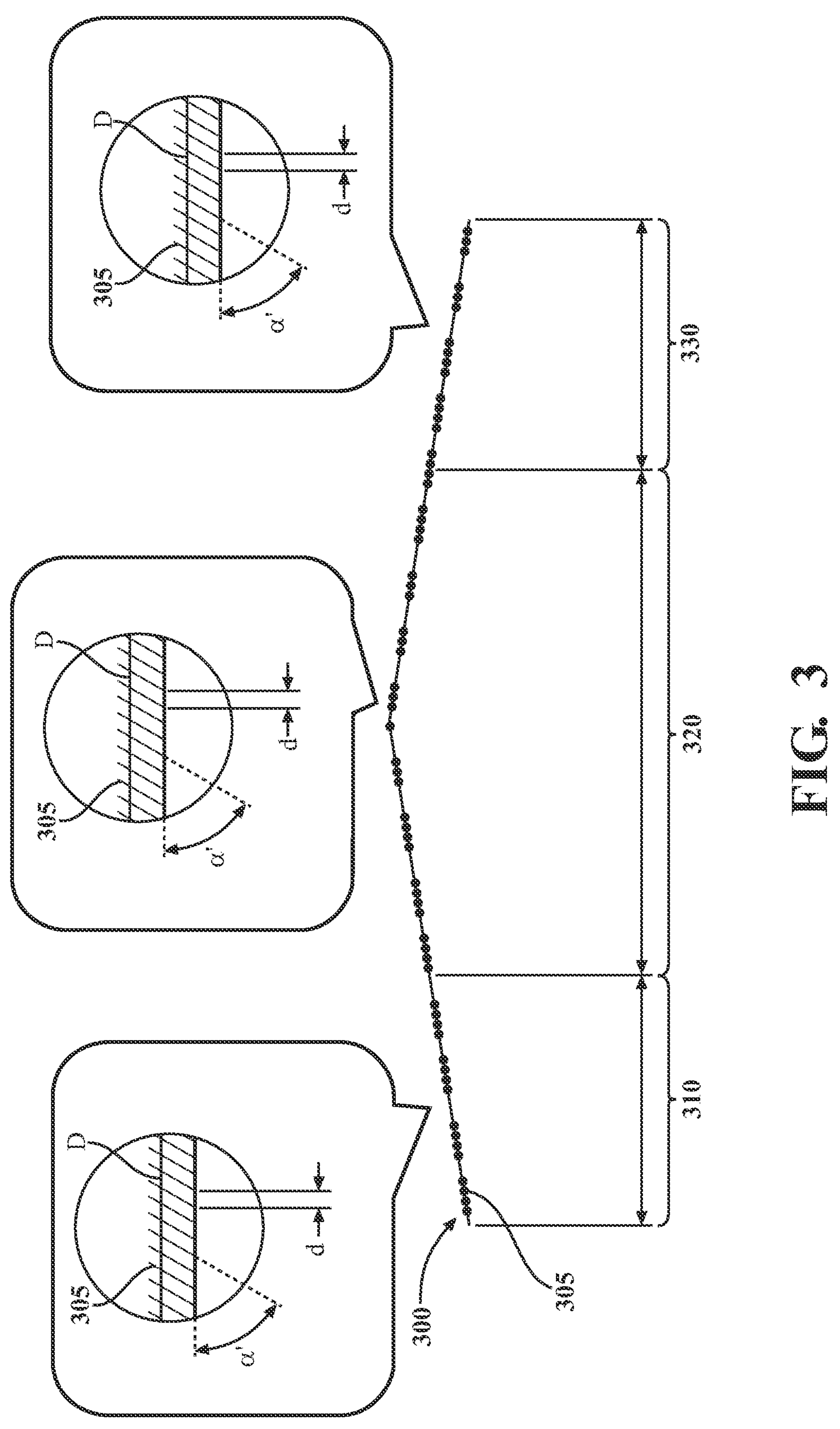
FIG. 3 illustrates one example of a groove for cracking a connecting rod.

With reference now to FIG. 3, one example of a groove 300 for a cracking line will now be described. The groove 300 may be any of the grooves described above in connection with FIGS. 1A-2, for example, the second groove 124B or the second groove 250B. Like the second groove 124B and the second groove 250B, the groove 300 is generally V-shaped, specifically with an inverted V-shape. However, the groove 300 can have a normally oriented V-shape, like the first groove 124A or the first groove 250A, or the groove 300 can have any other suitable shape. Other shapes for the groove 300 may be disclosed in Japanese Patent Application Publication Number 2021/196059A, which is hereby incorporated by reference in its entirety. In either instance, a first groove etched in the inner surface of the connecting rod may have an opposite orientation than a second groove etched in the inner surface. This may be advantageous during reassembly of the connecting rod after it is split. In some instances, the cracking surfaces of the connecting rod shaft 114 and the connecting rod cap 116 may have different topologies, and it may be advantageous to correctly pair the cracking surfaces during reassembly so that the connecting rod shaft 114 and the connecting rod cap 116 fit together in the best possible way. Therefore, the oppositely oriented V-shaped grooves 300 may indicate the correct alignment of the connecting rod cap 116 with respect to the connecting rod shaft 114 during reassembly.

Referring again to the groove 300 of FIG. 3, the groove 300 may be discontinuous. More specifically, the groove 300 may include a plurality of holes 305 that are spaced apart. For example, a laser 230 may be used to etch holes 305 that are spaced apart but that generally form a line. The holes 305 may be spaced apart by a distance d. The distance d may be any suitable distance. In one example, as shown in FIG. 3, the holes 305 are spaced apart by about 0.04 millimeters (mm). In order to create the holes 305, the laser 230 may be pulsed one or more times at the position of the hole 305. Accordingly, the holes 305 may each have a diameter D that is substantially equal to a diameter of the light beam 280 emitted by the laser 230. Moreover, with the light beam 280 being angled with respect to the inner surface of the larger bore of the connecting rod, the holes 305 may also be angled at an angle $\alpha'$ with respect to the surface 220, as shown in the expanded views in FIG. 3. For example, the angle α' may be about 60°, but the angle α' may be any other suitable angle.

The groove 300 may include multiple segments. For example, the groove 300 may include a first segment 310, a second segment 320, and a third segment 330. The first segment 310 may include the first 5 mm of the groove 300. The second segment 320 may include the next 10 mm of the groove 300. The third segment 330 may include the next 5 mm of the groove 300. While the groove 300 is described herein as having three segments, the groove 300 can have any suitable number of segments. Moreover, each segment 310, 320, and 330 can have any suitable length. In the first segment 310, the groove 300 may include around 125 holes 305. In the second segment 320, the groove 300 may include around 250 holes 305. In the third segment 330, the groove 300 may include around 125 holes 305. However, each segment 310, 320, and 330 may include any suitable number of holes 305.

As mentioned above, the groove 300 may be etched using two passes of the laser 230. A first pass of the laser 230 may be used to etch the holes 305 of all three segments 310, 320, and 330. During the first pass of the laser 230, the number of pulses used to etch each hole 305 may be varied along the length of the groove 300 in order to produce holes 305 of varying depth. More specifically, the holes 305 of the first segment 310 may have a different depth from the holes 305 of the second segment 320 and/or the third segment 330, the holes 305 of the second segment 320 may have a different depth from the holes 305 of the first segment 310 and/or the third segment 330, and the holes 305 of the third segment 330 may have a different depth from the holes 305 of the first segment 310 and/or the second segment 320. For example, each hole 305 of the first segment 310 may be etched using five pulses of the laser 230 to achieve a depth of about 0.38 mm for each hole 305 in the first segment 310. Each hole 305 of the second segment 320 may be etched using six pulses of the laser 230 to achieve a depth of about 0.45 mm for each hole 305 in the second segment 320. Each hole 305 of the third segment 330 may be etched using four pulses of the laser 230 to achieve a depth of about 0.32 mm for each hole 305 in the third segment 330. However, during the first pass of the laser 230, the holes 305 in each segment 310, 320, and 330 may be etched using any suitable number of pulses of the laser 230 to achieve any suitable depth.

A second pass of the laser 230 may then be used to increase the depths of the holes 305. By increasing the depths of the holes 305, the second pass may create a more brittle fracturing surface in the inner surface of the larger bore of the connecting rod. This may decrease the cracking load, which may help produce cracking surfaces that are smoother, thus producing higher quality cracked components. For example, each hole 305 of the first segment 310 may be etched using an additional five pulses of the laser 230 to achieve a depth of about 0.45 mm for each hole 305 in the first segment 310 (e.g., to increase the depth from about 0.38 mm to about 0.45 mm). Each hole 305 of the second segment 320 may be etched using an additional six pulses of the laser 230 to achieve a depth of about 0.51 mm for each hole 305 in the second segment 320 (e.g., to increase the depth from about 0.45 mm to about 0.51 mm). Each hole 305 of the third segment 330 may be etched using an additional four pulses of the laser 230 to achieve a depth of about 0.37 mm for each hole 305 in the third segment 330 (e.g., to increase the depth from about 0.32 mm to about 0.37 mm). However, during the second pass of the laser 230, the holes 305 of each segment 310, 320, and 330 may be etched using any suitable number of pulses of the laser 230 to achieve any suitable increase in depth.

Referring again to FIG. 2, the laser(s) 230 may be any suitable type of laser. In one example, the laser(s) 230 may be an Omron MX-Z2000H-V1 laser. The laser(s) 230 may operate at any suitable voltage. For example, the laser(s) 230 may operate at 120 volts (V). The laser(s) 230 may also operate at any suitable frequency and power. For example, the laser(s) 230 may operate at about 24 kilohertz (kHz) and about 15 watts (W). Moreover, the laser(s) 230 may etch the connecting rod at a machining speed of 2 millimeters per second (mm/s) and a moving speed of 900 mm/s.

Figure 4:
FIG. 4 illustrates one example of a method of cracking a connecting rod.
Figure 4:
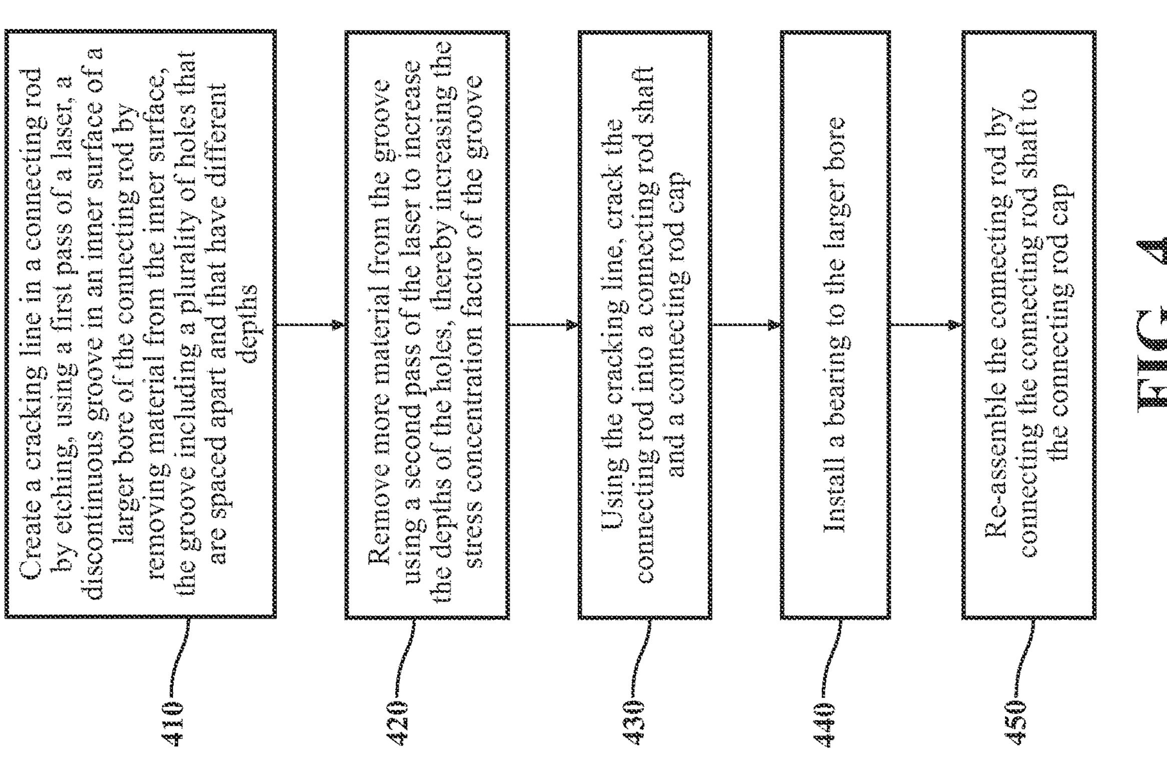

Referring to FIG. 4, a method 400 for connecting a cracking rod 100 is shown. The method 400 will be described from the viewpoint of the system 200 of FIG. 2. However, it should be understood that this is just one example of implementing the method 400. While the method 400 is discussed in combination with the system 200, it should be appreciated that the method 400 is not limited to being implemented within the system 200 but is instead one example of a system that may implement the method 400.

The method 400 may begin at step 410. In step 410, a first pass of a laser 230 may be used to etch a groove 300 in an inner surface of a larger bore of a connecting rod by removing material from the inner surface. The groove 300 forms the cracking line and may be discontinuous. The groove 300 may include a plurality of holes 305 that are spaced apart and that have different depths. For example, the holes 305 may be spaced apart by about 0.04 mm. Moreover, the groove 300 may include a first segment 310 having holes 305 with a depth of about 0.38 mm, a second segment 320 having holes 305 with a depth of about 0.45 mm, and a third segment 330 having holes 305 with a depth of about 0.32 mm. The method 400 may then proceed to step 420.

In step 420, using a second pass of the laser 230, more material may be removed from the groove 300 to increase the depths of the holes 305, thereby increasing the stress concentration factor of the groove 300. For example, the second pass may be used to increase the depth of the holes 305 in the first segment 310 to about 0.45 mm, to increase the depth of the holes 305 in the second segment 320 to about 0.51 mm, and to increase the depth of the holes 305 in the third segment 330 to about 0.37 mm. The method 400 may then proceed to step 430.

In step 430, using the groove 300, the connecting rod may be cracked along the cracking line into a connecting rod shaft and a connecting rod cap. For example, a wedge element may be introduced to the larger bore to crack the connecting rod. The method 400 may then proceed to step 440. In step 440, a bearing may be installed to the larger bore. For example, a bearing may be installed to an inner surface of the larger bore. The method 400 may then proceed to step 450. In step 450, the connecting rod may be reassembled by connecting the connecting rod shaft to the connecting rod cap. For example, apertures in the connecting rod shaft and the connecting rod cap may be connected using bolts or any other suitable fastener.

As described above, the two-pass laser method for cracking a connecting rod may produce smoother cracking surfaces and higher quality parts. More specifically, the two-pass laser method may result in a lower cracking load, reduced chipping (i.e., material that may break off the connecting rod during cracking), and surface roughness compared to the one-pass laser method. For example, the cracking load required to crack the connecting rod using the one-pass laser method may be between about 15,000 Newtons (N) and about 20,000 N, while the cracking load using the two-pass laser method may be between about 10,000 N and about 15,000 N. As mentioned above, a lower cracking load is beneficial because it produces smoother cracking surfaces, allowing the cracked components to be reassembled in an improved manner.

In another example, the chipping of the cracked components produced with the two-pass laser method may be lower than the chipping of the cracked components produced with the one-pass laser method. Generally, chipping refers to material that may break off the connecting rod during cracking (e.g., edge chipping). When material breaks off during cracking, the cracking surfaces may have increased roughness and/or less surface area contact that reduces the quality of the reassembled connecting rod. The chipping of the cracked components produced with the one-pass laser method may be about 50%, while the chipping of the cracked components produced with the two-pass laser method may be about 0%.

Finally, the surface roughness of the cracking surfaces produced with the two-pass laser method may be lower than the surface roughness of the cracking surfaces produced with the one-pass laser method. For example, the surface roughness of cracking surfaces produced with the two-pass laser method may be about 0.0790, while the surface roughness of the cracking surfaces produced with the one-pass laser method may be about 0.1110.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for creating a cracking line in a connecting rod, the method comprising:

etching, using a first pass of a laser, a groove in an inner surface of a larger bore of the connecting rod by removing material from the inner surface, the groove being discontinuous, including a plurality of holes that are spaced apart and that have different depths, and including at least a first segment containing a first group of holes, a second segment containing a second group of holes, and a third segment containing a third group of holes; and removing more material from the groove using a second pass of the laser with a different number of laser pulses for each of the first segment, the second segment, and the third segment to increase the depths of the holes to a different depth for each of the first segment, the second segment, and the third segment, thereby increasing a stress concentration factor of the groove.

2. The method of claim 1, wherein the holes are spaced apart by 0.04 millimeters.

3. The method of claim 1, wherein the groove has a general V-shape.

4. The method of claim 1, wherein the connecting rod includes two grooves on opposing sides of the larger bore, wherein a first groove has a general V-shape and wherein a second groove has a general inverted V-shape, wherein the general V-shape and the general inverted V-shape indicate a correct realignment of separate components of the connecting rod after cracking.

5. The method of claim 1, wherein the groove is etched at a 30° angle with respect to a plane defined by the surface upon which the connecting rod is placed and wherein the holes are angled 30° with respect to a plane defined by the surface upon which the connecting rod is placed.

6. The method of claim 1, further comprising:

using the cracking line, cracking the connecting rod into a connecting rod shaft and a connecting rod cap;

installing a bearing to the larger bore; and re-assembling the connecting rod by connecting the connecting rod shaft to the connecting rod cap.

7. A method for creating a cracking line in a connecting rod, the method comprising:

etching, using a first pass of a laser, a groove in an inner surface of a larger bore of the connecting rod by removing material from the inner surface, the groove being discontinuous and including a plurality of holes that are spaced apart and that have different depths;

removing more material from the groove using a second pass of the laser to increase the depths of the holes, thereby increasing a stress concentration factor of the groove, wherein the groove includes a first groove segment containing a first group of holes, a second groove segment containing a second group of holes, and a third groove segment containing a third group of holes; and using the first pass of the laser:

etching the holes of the first groove segment using five pulses to achieve a depth of 0.38 millimeters for the first group of holes;

etching the holes of the second groove segment using six pulses to achieve a depth of 0.45 millimeters for the second group of holes; and etching the holes of the third groove segment using four laser pulses to achieve a depth of 0.32 millimeters for the third group of holes.

8. A method for creating a cracking line in a connecting rod, the method comprising:

etching, using a first pass of a laser, a groove in an inner surface of a larger bore of the connecting rod by removing material from the inner surface, the groove being discontinuous and including a plurality of holes that are spaced apart and that have different depths;

removing more material from the groove using a second pass of the laser to increase the depths of the holes, thereby increasing a stress concentration factor of the groove, wherein the groove includes a first groove segment containing a first group of holes, a second groove segment containing a second group of holes, and a third groove segment containing a third group of holes; and using the second pass of the laser:

etching the holes of the first groove segment using an additional five pulses to increase the depth of the first group of holes to 0.45 millimeters;

etching the holes of the second groove segment using an additional six pulses to increase the depth of the second group of holes to 0.51 millimeters; and etching the holes of the third groove segment using an additional four pulses to increase the depth of the third group of holes to 0.37 millimeters.

* * * * *